(12) United States Patent
Gladh (10) Patent No.: US 7,618,307 B2
(45) Date of Patent: Nov. 17, 2009

(54) DIRECT LINKING OF SAUSAGE FILLING AND CLIPPING MACHINE AND SAUSAGE CONVEYOR APPARATUS

(75) Inventor: Steven Gladh, Göteborg (SE)

(73) Assignee: Poly-Clip System GmbH & Co. KG (DE)

( * ) Notice: Subject to any disclaimer, the term of this patent is extended or adjusted under 35 U.S.C. 154(b) by 265 days.

(21) Appl. No.: 11/733,922

(22) Filed: Apr. 11, 2007

(65) Prior Publication Data
US 2007/0254571 A1    Nov. 1, 2007

(30) Foreign Application Priority Data
Apr. 11, 2006  (DE)  ......................... 10 2006 017 017

(51) Int. Cl.
*A22C 11/00*  (2006.01)

(52) U.S. Cl. ...................................... 452/51

(58) Field of Classification Search ............. 452/21–23, 452/26, 30–32, 35, 37, 46–48, 51
See application file for complete search history.

(56) References Cited

U.S. PATENT DOCUMENTS

| | | | |
|---|---|---|---|
| 3,624,774 A | | 11/1971 | Marietta, Jr. |
| 4,547,931 A | | 10/1985 | Staudenrausch et al. |
| 4,880,105 A | * | 11/1989 | Kasai et al. ............... 198/465.4 |
| 4,969,233 A | * | 11/1990 | Stanley ......................... 452/30 |
| 5,100,364 A | * | 3/1992 | Kollross et al. .............. 452/185 |
| 5,109,648 A | * | 5/1992 | Evans ........................ 53/134.1 |
| 5,755,022 A | * | 5/1998 | Whittlesey .................... 29/788 |
| 6,290,591 B1 | * | 9/2001 | Hergott et al. ................. 452/51 |
| 6,419,077 B1 | * | 7/2002 | White et al. ............. 198/468.6 |
| 6,523,462 B1 | | 2/2003 | Johnson et al. |
| 6,524,178 B1 | * | 2/2003 | Fassler et al. ................. 452/37 |
| 6,786,813 B2 | | 9/2004 | Shefet et al. |
| 7,166,020 B2 | * | 1/2007 | Van De Wal .................. 452/32 |
| 2002/0083848 A1 | | 7/2002 | Mueller et al. |
| 2004/0118302 A1 | | 6/2004 | Muller |

FOREIGN PATENT DOCUMENTS

DE          32 38 023        4/1984

(Continued)

OTHER PUBLICATIONS

EP 07 00 0691 Search Report.

*Primary Examiner*—Thomas Price
(74) *Attorney, Agent, or Firm*—Hahn Loeser & Parks LLP; Michael H. Minns (57) ABSTRACT

A system having a sausage and filling clipping machine and a sausage conveyor apparatus as well as a method of controlling the system is described. In the system the sausage filling and clipping machine has a filling pipe. The motor-driven sausage conveyor apparatus includes at least one conveyor element and is arranged downstream of the filling pipe of the sausage filling and clipping machine in the advance direction of the sausage. It is further provided that the sausage conveyor apparatus is formed by a chain link conveyor and is arranged immediately adjacent to the filling pipe of the sausage filling and clipping machine in such a way that a sausage product which is filled at the filling pipe of the sausage filling and clipping machine and closed can be engaged by the at least one conveyor element of the chain link conveyor.

18 Claims, 6 Drawing Sheets

FOREIGN PATENT DOCUMENTS

| | | |
|---|---|---|
| DE | 197 15 598 | 10/1998 |
| DE | 100 55 310 | 5/2002 |
| EP | 0 048 507 | 8/1981 |
| EP | 0 424 675 | 9/1990 |
| EP | 1 421 854 | 5/2004 |
| WO | 92/03929 | 3/1992 |

* cited by examiner

DIRECT LINKING OF SAUSAGE FILLING AND CLIPPING MACHINE AND SAUSAGE CONVEYOR APPARATUS

TECHNICAL FIELD

The invention concerns a system comprising a sausage filling and clipping machine and a sausage conveyor apparatus.

BACKGROUND OF THE INVENTION

It is usual in practice in the production of sausage products that the operation of filling a sausage to be formed or introducing the sausage meat is effected over a filling pipe into a packaging material that is closed at one end and has a tubular or bag-like configuration, generally formed of a flexible material. After the completion of the filling operation, a constricted plaited portion that is free from filling material is formed by means of two pairs of displacer shears. Two closures in the form of closure clips are then fitted onto that plaited portion, the closure clips closing the packaging material on both sides of the plaited portion. After that the plaited portion is severed. In order to further process the sausage produced in that way, that is to say, therefore to be able to smoke, dry, etc., the sausage product, a thread is supplied such that, when the clips are fitted to a sausage product, the thread is enclosed by the clips and is thus fixed to the sausage.

As already mentioned, many sausage products are then subjected to further processing, for example by smoking in a smoking chamber. For that purpose, the sausages are hung up separately on their threads on smoking bars, so that as far as possible, they do not touch each other. In practice in that respect, the smoking bars are fitted with sausages by hand.

In order to permit that to be done, for example, ring rounds or curved sausages are filled on a table with a horizontally extending table plate that directly adjoins the filling pipe of a sausage filling and clipping machine. Then the sausages, which are oriented in a horizontal plane, slide along an inclined downwardly extending ramp to a collecting location where manual loading of the stocks with sausages is effected.

DE 32 38 023 A1 (also published as U.S. Pat. No. 4,527,931) further discloses an apparatus in that there is provided a transport belt directly adjoining the discharge of the filling pipe of the sausage filling and clipping machine. The sausages that are removed from the filling pipe are conveyed by means of the transport belt in the form of a chain of sausages or combined together in paired relationship in a lying condition, that is to say in a horizontal orientation, to a transport screw. The transport screw in turn conveys the sausages to a magazine for smoking stocks on which the sausages are transferred to the individual smoking stocks.

The first-outlined system in the state of the art suffers from the disadvantage that the sausages slide along an inclined ramp, which involves the danger of damaging the packaging material of the sausages. In addition the sausages have to be gripped by hand and turned through 90° so that they can be pushed on to the smoking stocks, in a vertical orientation. That involves a considerable level of handling complication and expenditure.

In comparison, the last-discussed system in the state of the art is found to suffer from the disadvantage in that two conveyor apparatuses are arranged between the filling opening of the filling pipe and the smoking stock magazine, with the structure and mode of operation of the two conveyor apparatuses being quite different. Besides the structural complication and expenditure that this involves, a complicated control system is required in order to co-ordinate the filling operation and transporting the sausages away to the smoking stock magazine.

SUMMARY OF THE INVENTION

An object of the invention is to provide a system and a method of the kind set forth in the opening part of this specification, which in comparison with the state of the art allow a markedly simpler and thus less expensive structure. In particular an object of the present invention is to provide a system and a method of the kind set forth in the opening part of this specification, which in comparison with the state of the art, make it possible to hang up individual sausages, such as for example ring round sausages, with a clipped-in thread, in a simple fashion.

Because the sausage conveyor apparatus is in the form of a chain link conveyor and because the arrangement of the chain link conveyor in directly adjacent relationship with the filling pipe of the sausage filling and clipping machine in such a way that a sausage product that has been filled at the filling pipe of the sausage filling and clipping machine and closed can be engaged by the at least one conveyor element of the chain link conveyor, this provides a simple structure and operation of the system comprising the sausage filling and clipping machine and the sausage conveyor apparatus. As a chain link conveyor makes it possible to use quite different conveyor elements depending on the respective transport function to be performed, there is thus the possible option of engaging the sausage products at the filling pipe in such a way that, when they are picked up, they are already in a condition of vertical orientation, which allows a simple transfer of the sausage products for example to smoking stocks. In other words the chain link conveyor adjoins the sausage filling and clipping machine directly and without the interposition of any further conveyor devices so that it is possible to dispense with tables, ramps and the like. Furthermore, only one conveyor apparatus may be used for conveying the sausage products from the sausage filling and clipping machine to a transfer location for a subsequent step in further processing of the sausage products, such as for example a smoking stock magazine, so that not only are the manufacturing costs of the system according to the invention considerably reduced, but also its control complication and the costs that this entails. Furthermore, the system according to the invention also permits simple adaptation to sausage products that are to be processed in different ways. Thus, besides rounds or curved sausages, it is also possible for the system according to the invention to be used to process sausages which are joined together in pairs, and so forth.

As already mentioned hereinbefore, quite different conveyor elements can be used for the chain link conveyor, depending on the respective demands of the use thereof. It is particularly advantageous if the conveyor element of the chain link conveyor is formed by a hook that is held fixed to the drive mechanism of the chain link conveyor in the conveyor direction of the latter. The hook allows the sausage products to be held at the sausage threads, which may be provided, or other suspension means, with the sausages in a vertical orientation.

Basically, transfer of the sausage to the conveyor element of the chain link conveyor can be effected by the sausage falling downwardly after release from the sausage filling and clipping machine as a consequence of the force of gravity acting thereon, and being caught by the conveyor element of the chain link conveyor. In that respect however, the difficulty arises that the conveyor element of the chain link conveyor must be positioned very accurately with respect to the clipping machine or the falling trajectory of the sausage. To permit reliable transfer of the sausage from the sausage filling and clipping machine to the conveyor element of the chain link conveyor, it is further advantageous if the conveyor element of the chain link conveyor is reversibly movable from a conveyor position into a transfer position, at least in the region of the filling pipe.

The movement of the conveyor element of the chain link conveyor for reversibly reaching the transfer location can be a linear movement, for example a horizontal movement. A space-saving solution for such movement is afforded if the conveyor element of the chain link conveyor is reversibly pivotable from a conveyor position into a transfer position at least in the region of the filling pipe.

Alternatively or supplemental to the reversible movement to the conveyor element from the conveyor position into the transfer position, it can further be provided that the conveyor element of the chain link conveyor has a catch portion that projects in the conveyor direction of the chain link conveyor with respect to the plane containing the longitudinal center line of the conveyor element. If, for example, the chain link conveyor extends in a horizontal plane and the conveyor element in a vertical plane, the conveyor element thus has a catch portion that projects out of the vertical plane of the conveyor element in the conveyor direction. In that way, the conveyor element can move into the circle or ring that is formed by a sausage product and, which extends in a vertical plane, without the sausage impeding that. In a plan view from the horizontal plane, that catch portion of the conveyor element can thus be at a spacing relative to the longitudinal axis of the conveyor element that intersects that horizontal plane.

Basically, it is possible for the chain link conveyor to have only one conveyor element. In order to permit profitable production, however, it is advantageous if the chain link conveyor has a plurality of conveyor elements. In that case, the conveyor elements of the chain link conveyor can be arranged in equidistant relationship with each other. The conveyor elements may be arranged at an unequal spacing relative to each other.

The most widely varying configurations can be selected for the chain link conveyor. Thus in principle, there is the possibility of the chain link conveyor being in the form of a reciprocating conveyor. A particularly economic solution provides that the chain link conveyor is a circulating continuous conveyor.

Once again all conceivable solutions can be used as the drive mechanism for the chain link conveyor. A configuration for the drive mechanism, which permits robust and simple fixing of the conveyor elements, provides that the drive mechanism of the chain link conveyor is an endless traction chain.

The conveyor path defined by the chain link conveyor can again be adapted to the respective factors involved, which is a further advantage of a chain link conveyor. A simple solution that is easy to implement provides that the drive mechanism of the chain link conveyor defines a conveyor path that is at least approximately in a horizontal plane and, which is at least approximately in the form of an elongate oval.

A compact structure for the system according to the invention can be achieved if the chain link conveyor is arranged with a direction-changing portion of the conveyor path in directly adjacent relationship with the filling pipe. It will be appreciated, however, that there is also the possibility of the chain link conveyor adjoining the sausage filling and clipping machine, with one of the longitudinal portions of the chain link conveyor.

In order reliably to implement the transfer of the sausage from the sausage filling and clipping machine to the conveyor apparatus, it is further advantageous if there is transfer area of the sausage product between the chain link conveyor and the filling pipe. In that respect, it is advantageous if the transfer area extends primarily away from the filling pipe and downwardly. It will be appreciated that in this case the transfer area can also extend upwardly in order, for example, to permit the conveyor elements to move reversibly from the conveyor position into the transfer position, i.e., to provide room for movement or space for the conveyor elements to move or pivot. That transfer area also serves to provide that the sausage product that is formed at the filling pipe is formed in a vertical plane. If the sausage product is, for example, a round or curved sausage, then the round configuration of the sausage extends in that vertical plane. That facilitates transfer of the sausage product to the conveyor element of the chain link conveyor.

As already mentioned hereinbefore, a thread is frequently fitted to sausage products, to permit the sausage to be hung up. In order in that case to permit or promote the formation of the sausage shape, for example a round or curved configuration, it is further advantageous if there is provided a thread feed device that includes means for at least temporarily holding the thread fast. That step of temporarily holding the thread fast can take place, for example, during the operation of forming the sausage shape. For removal of the sausage product from the sausage filling and clipping machine, or shortly before, the thread can be released from the thread holding means and further thread fed. As an alternative to that last step, it is possible that the thread portion that is necessary for releasing the sausage product from the sausage filling and clipping machine has already been fed by the thread feed device so that the thread is held fast, together with that additional thread portion.

In principle, the sausage filling and clipping machine and the sausage conveyor apparatus can each have their own control device. In that respect, co-ordination between the two units can be made possible by a mutually matched operating procedure for the two units, which is possibly assisted by suitable sensors. There is however also the possibility of providing a control device that controls the chain link conveyor and at least the filling operation of the sausage filling and clipping machine. In that respect, the common control device can be superior to the control devices, which are respectively independently provided for the sausage filling and clipping machine and the sausage conveyor apparatus, or there can be a single control device for both units jointly, which controls the procedures in those units overall or at least in part.

In accordance with the invention the method of controlling a system comprising a sausage filling and clipping machine and a sausage conveyor apparatus, in which the sausage filling and clipping machine has a filling pipe and the motor-driven sausage conveyor apparatus includes at least one conveyor element and is arranged downstream of the filling pipe of the sausage filing and clipping machine in the sausage advance direction, includes the following steps: arranging the conveyor element of the conveyor apparatus which is formed by a chain link conveyor in a readiness position in the region of the filling pipe; filling sausage meat into a tubular flexible packaging material at the filling pipe of the sausage filling and clipping machine, closing the packaging material and separating the sausage product formed in that way from the further packaging material on the filling pipe; moving the conveyor element from the readiness position into a transfer position at least prior to separation of the sausage product; and transfer of the sausage product to the conveyor element. As can be seen therefrom the method according to the invention involves only a few steps for transferring a sausage product from the sausage filling and clipping machine to the sausage conveyor apparatus.

In principle, transfer of the sausage from the sausage filling and clipping machine can already be effected upon production of the sausage, in such a way that the conveyor element of the chain link conveyor comes into contact with the sausage product. In order however not to adversely affect the sausage production procedure, it is advantageous if transfer of the sausage product to the conveyor element is effected immediately shortly before or after the separation operation.

A transfer step that is particularly simple to implement is achieved by the transfer of the sausage product being effected by the action of the force of gravity on the sausage product. In addition, the force of gravity can also be used to provide that the sausage product is oriented in the position desired for further processing, at the conveyor element of the chain link conveyor. If the sausage product is a round or circular sausage in ring form then, after being taken over by the conveyor element, it slips along the conveyor element until the thread portion connecting the two ends of the sausage causing the sausage to be held on the conveyor element.

Usually a table is used for production of a round or circular sausage, with the round ring of the sausage being produced in a horizontal orientation. In order to permit the formation of the sausage, for example a round sausage ring, it can further be provided that a thread fixed to the end of the sausage product, which is the leading end in the advance direction, is held fast at least during the filling operation. In that case formation of the sausage product can take place in a vertical plane.

So that it is possible to implement a simple transfer of the sausage product to the conveyor element of the chain link conveyor and/or so that it is possible for the sausage shape to be formed in a vertical plane, it is further possible to provide a transfer area for the sausage product.

In other respects, the same advantages and configurations apply to the method according to the invention as were set forth in relation to the system according to the invention.

BRIEF DESCRIPTION OF THE DRAWINGS

Further advantageous configurations and an embodiment by way of example of the invention are described hereinafter with reference to the accompanying drawings. In this connection it is to be noted that the terms 'left', 'right', 'down' and 'up' used in the description of the specific embodiment relate to the drawings when positioned with the FIG. identifications and reference numerals normally readable. In the drawings.

DETAILED DESCRIPTION OF THE DRAWINGS

FIGS. 1 through 6 which also serve to describe the method according to the invention diagrammatically show the essential components of a sausage filling and clipping machine 10 and a sausage conveyor apparatus 50, which afford the system according to the invention. It is to be noted in this respect that only the components of the respective machine 10 and apparatus 50 respectively that are necessary for understanding the system and method according to the invention are shown. It is also to be noted that the system or method according to the invention is used in the production of a round or ring-shaped circular sausage W which is also diagrammatically shown in FIGS. 1 through 6. It will be appreciated that the invention can also be used in relation to other forms of sausage, such as for example sausages which are joined together in pairs.

The essential components of the sausage filling and clipping machine 10 are a filling pipe 12 with a mouth opening 14 arranged at the left-hand end of the filling pipe 12 and a sausage casing brake 16 provided around the filling pipe 12 in the proximity of the mouth opening 14. Disposed in front of the mouth opening 14 in the advance direction VR of the round or circular sausage W to be produced are a first and a second pair of displacer shears 18 and 20 respectively which each comprise an upper and a lower displacer shear pair component 18a, 20a and 18b, 20b respectively, a clip fitting and clip closing device 22 that includes a punch (not identified in greater detail) and a die (also not identified in greater detail), as well as a severing blade 24 (see also FIG. 4).

A flexible sausage casing WH is pulled on to the outside surface 12a of the filling pipe 12 which is of a cross-section which is at least approximately in the form of a circular ring, more specifically in such a way that a closed end WH' of the sausage casing WH, which is the front end in the advance direction VR, is disposed in front of the mouth opening 14, the sausage casing WH is passed through between the outside surface 12a of the filling pipe 12 and the casing brake 16 and a stored supply is formed on the outside surface 12a of the filling pipe 12 in the opposite direction to the advance direction VR behind the casing brake 16. The portion of the sausage casing WH, which forms the stored supply, is upset in a concertina-like configuration, as indicated in the drawings.

A sausage thread 30, hereinafter also referred to as the thread 30, is fixed to the leading closed end WH' of the sausage casing WH. At the beginning of production of the circular sausage W, the thread 30 is still joined to a thread supply on a yarn reel (not further shown) and extends therefrom in an at least approximately horizontal direction. It will be appreciated however that the thread path may also involve a different route insofar as it extends at least approximately horizontally in the region of the pairs of displacer shears 18, 20. If the yarn path deviates from the horizontal, the latter can be implemented by arranging suitable guide rollers. The yarn reel is held rotatably in a yarn dispenser (also not shown) that is provided to the right of the mouth opening 14 of the filling pipe 12. The thread dispenser also includes means for at least temporarily holding the thread fast so that the shaping of the round sausage can be assisted thereby.

The thread 30 is drawn off the yarn reel in the advance direction VR and passed through a guide opening 26a of a substantially vertically oriented guide plate 26 arranged in the region of the mouth opening 14 of the filling pipe 12. The yarn 30 runs from the guide opening 26a over the two lower components 18b, 20b of the two pairs of displacer shears 18, 20 to the leading end WH' of the sausage casing WH and is there fixedly joined to the sausage W to be formed by means of a first closure clip C1, at that end WH'.

The operation of filling a sausage W begins with filling material or sausage meat being pressed into the sausage casing WH through the filling pipe 12. As the front end WH' of the sausage casing is closed with the first closure clip C1, the sausage casing WH is filled up and at the same time draws further casing material WH out of the concertinaed stored supply on the filling pipe 12. When the sausage casing WH is being drawn off, it is retarded by the casing brake 16 in order to set the desired filling pressure in the sausage casing WH. The force caused by the filling pressure for drawing off the sausage casing WH from the stored supply on the filling pipe and the braking force resisting the same applied by the casing brake 16 are in equilibrium with each other.

The thread 30, which is fixed to the leading closed end WH' of the sausage casing WH by means of the first closure clip C1, provides that that sausage casing end WH' is held back as from a given filling amount so that, from that moment on, the sausage casing WH is deflected downwardly. In that respect, the degree of filling at which that deflection occurs and the extent to which the sausage casing WH is deflected depend on the length of the thread 30 that has been released from the thread dispenser. As shown in FIGS. 1 through 4, the resulting sausage W curves downwardly into a transfer area 40 for the sausage W, which is between the sausage filling and clipping machine 10 and the sausage conveyor apparatus 50.

The sausage conveyor apparatus 50 is arranged to the left of the transfer area 40 of the sausage or after the transfer area 40 in the advance direction VR. The sausage conveyor apparatus 50 is formed by a continuous conveyor in the form of a circulating chain link conveyor 52. The chain link conveyor 52 has as its drive mechanism an endlessly circulating traction chain 54 that its path of movement follows an elongate oval that is disposed in a horizontal plane. One of the two direction-changing or turning portions of that elongate oval path of movement, that is to say the right-hand direction-changing portion, is disposed to the left of the transfer area 40 of the sausage, in FIGS. 1 through 6.

The conveyor elements of the chain link conveyor 52 are formed by hooks 56 which are stationarily held at an equidistant spacing on the endless traction chain 54 in the conveyor direction of the chain link conveyor 52. In that arrangement the hooks 56 hang downwardly from the endless traction chain 54. The hook tips 56a of all hooks 56 face outwardly in this arrangement so that in the region of the transfer area 40 the hook tip 56a faces in the direction of the filling machine 10.

The hook 56 of the chain link conveyor 52 further has a catch portion 56b which projects in the conveyor direction of the chain link conveyor 52, from the vertically extending main plane in which the hook 56 primarily extends or in which the longitudinal center line (not further shown) of the hook 56 extends. Accordingly, the hook 56 can extend into the circle or ring that is formed by the sausage product and which, as described hereinbefore, also extends in a vertical plane, without the sausage W impeding that. In a plan view from the horizontal plane, that catch portion 56b of the hook 56 is therefore at a spacing relative to the longitudinal axis of the hook 56, which intersects that horizontal plane.

Figure 1:
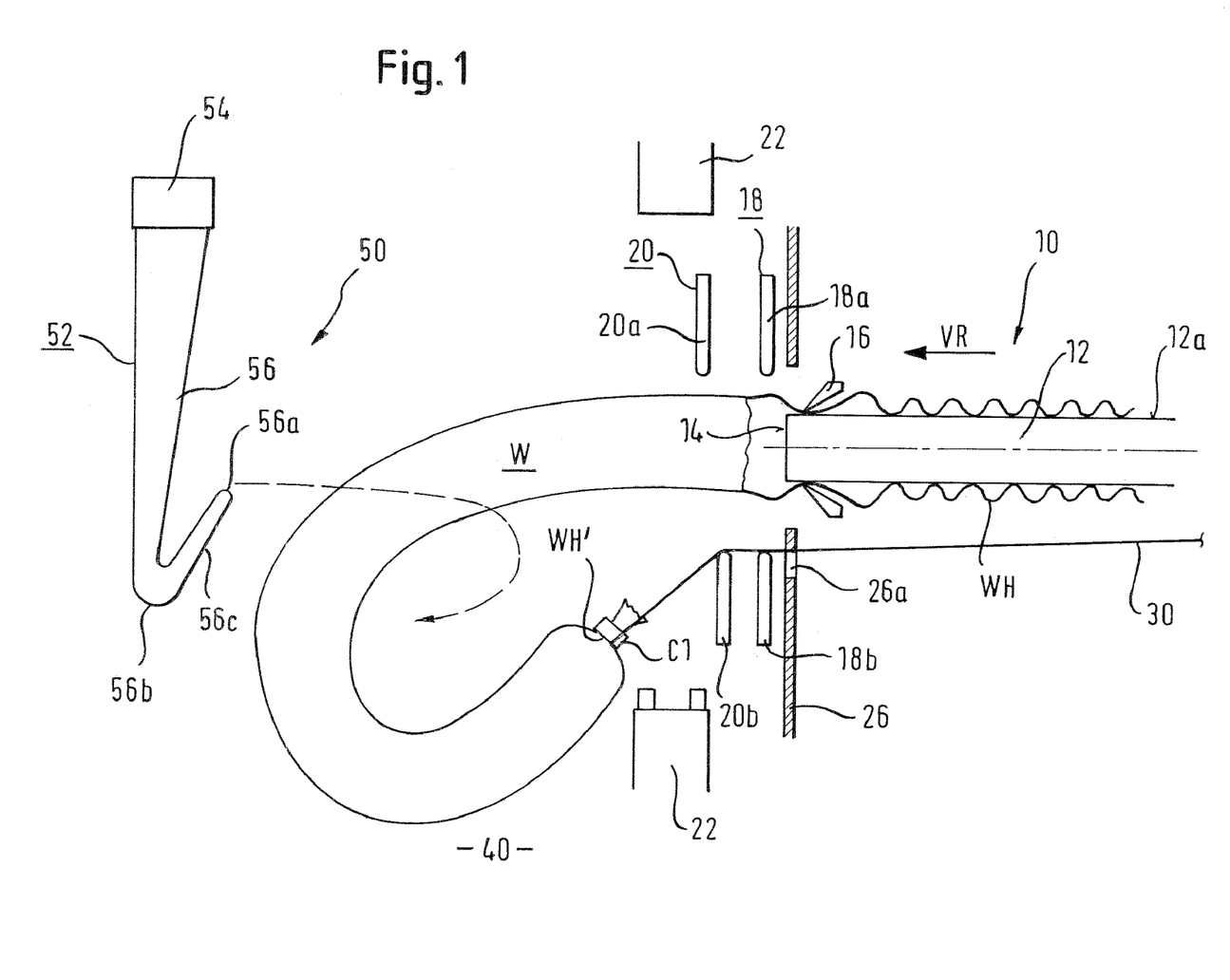
FIGS. 1 through 6 show diagrammatic views of the system according to the invention in different operating steps of the method according to the invention.

Alternatively or supplemental thereto, each hook 56, at least in the region of the transfer area 40 or in the region of the filling pipe 12, can be reversibly pivoted from its conveyor or readiness position shown in FIG. 1 in a direction towards the filling pipe 12 or into the transfer area 40 in a vertical plane, into a transfer position. That can be implemented for example by a suitably designed sliding guide or by a motor drive for the hook 56. It is also to be noted that the hooks 56 can be replaceably mounted to the endless traction chain 54 so that hooks 56 of differing shapes can be used depending on the respective situation of use or the sausage W to be processed.

Figure 2:
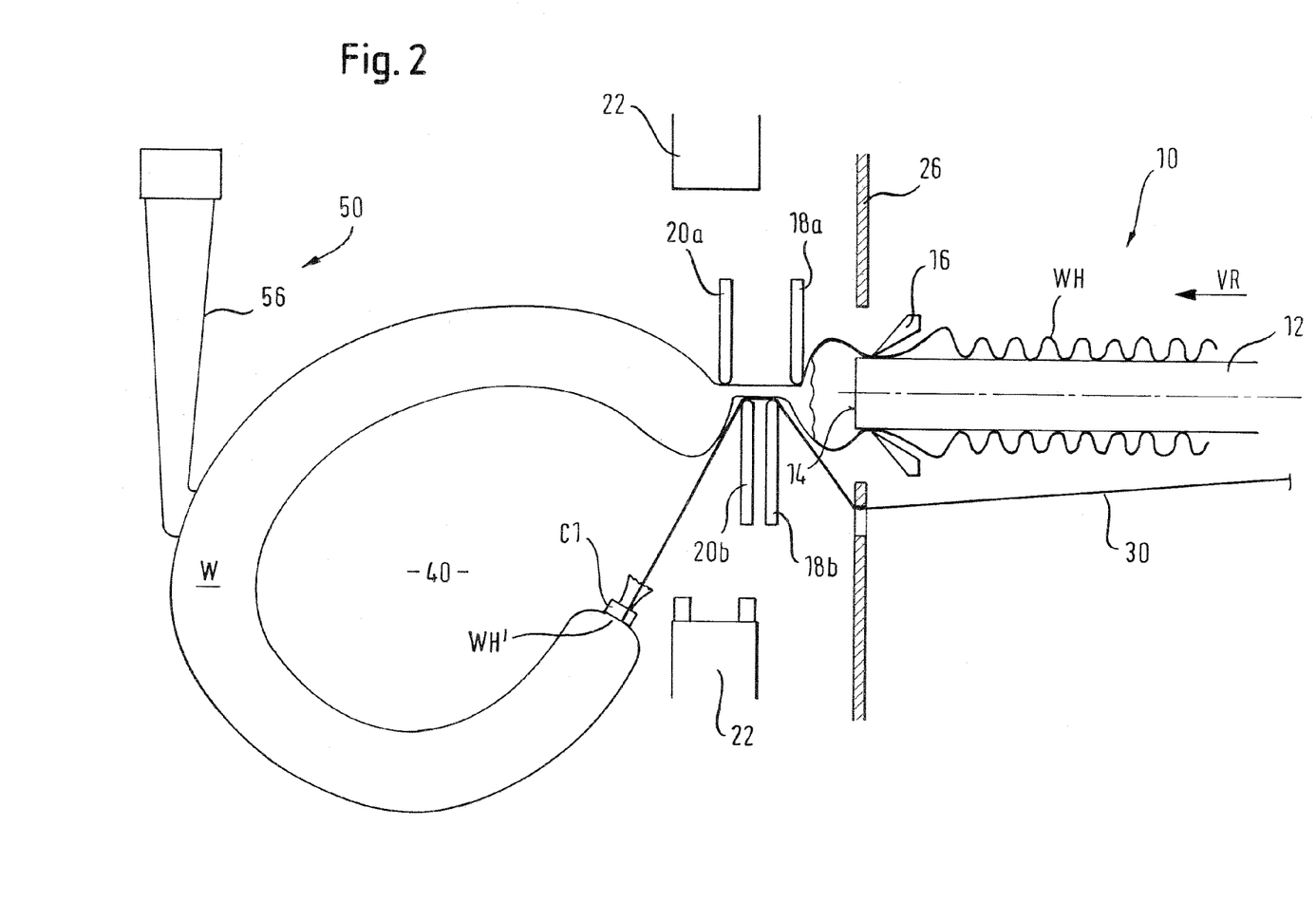

The system and method according to the invention operate as follows, in which respect it is to be noted that this procedure is controlled by a control device which is not further shown here:

As soon as the sausage W is filled to the desired extent, that is to say the filling operation for that sausage W is concluded, the two pairs of displacer shears 18, 20 close and in that way cut off the sausage casing WH. At the beginning of the cutting operation, the two pairs of displacer shears 18, 20 are in a starting position as shown in FIG. 1 in mutually juxtaposed relationship such that the two upper displacer shear pair components 18a, 20a are at a slight horizontal spacing, within which are arranged the two lower displacer shear pair components 18b, 20b which are bearing closely against each other. In that respect, the size of that spacing is selected such that, when the displacer shear pair components 18a, 18b and 20a, 20b are then brought together, the two upper displacer shear pair components 18a, 20a respectively bear against the outside of the lower displacer shear pair components 18b, 20b, that is to say at the sides of the lower displacer shear pair components 18b, 20b that face away from each other. To implement the cutting-off operation itself, the upper and lower displacer shear pair components 18a, 18b and 20a, 20b respectively of the displacer shear pairs 18, 20 are moved towards each other in a vertical direction. In that case, the filling material is displaced out of the sausage casing WH at the constriction location. That condition is shown in FIG. 2.

Then the two displacer shear pairs 18, 20 are spread in a horizontal direction in their vertical position which they have reached after the vertical movement of the displacer shear pair components 18a, 18b and 20a, 20b respectively, by the second displacer shear pair 20 being moved in the advance direction VR away from the first displacer shear pair 18. When that happens, the second displacer shear pair 20 draws further sausage casing material WH through the first displacer shear pair 18 from the stored supply. In addition, in that operation, a second length of thread can be released from the thread dispenser so that in the spreading operation, the second displacer shear pair 20 can pull not only sausage casing material WH but also the thread 30 through the first displacer shear pair 18. Alternatively or supplemental thereto that second thread portion can already be previously drawn off the thread dispenser or the yarn reel and held in readiness in a suitable fashion. In that situation the thread 30 and the sausage casing WH move at the same speed.

In that case, the hook 56, which is in its starting position, is moved at the same time or already at an earlier time into a readiness position by the chain link conveyor 52. It is accordingly disposed in the immediate proximity beside the sausage W.

Figure 3:
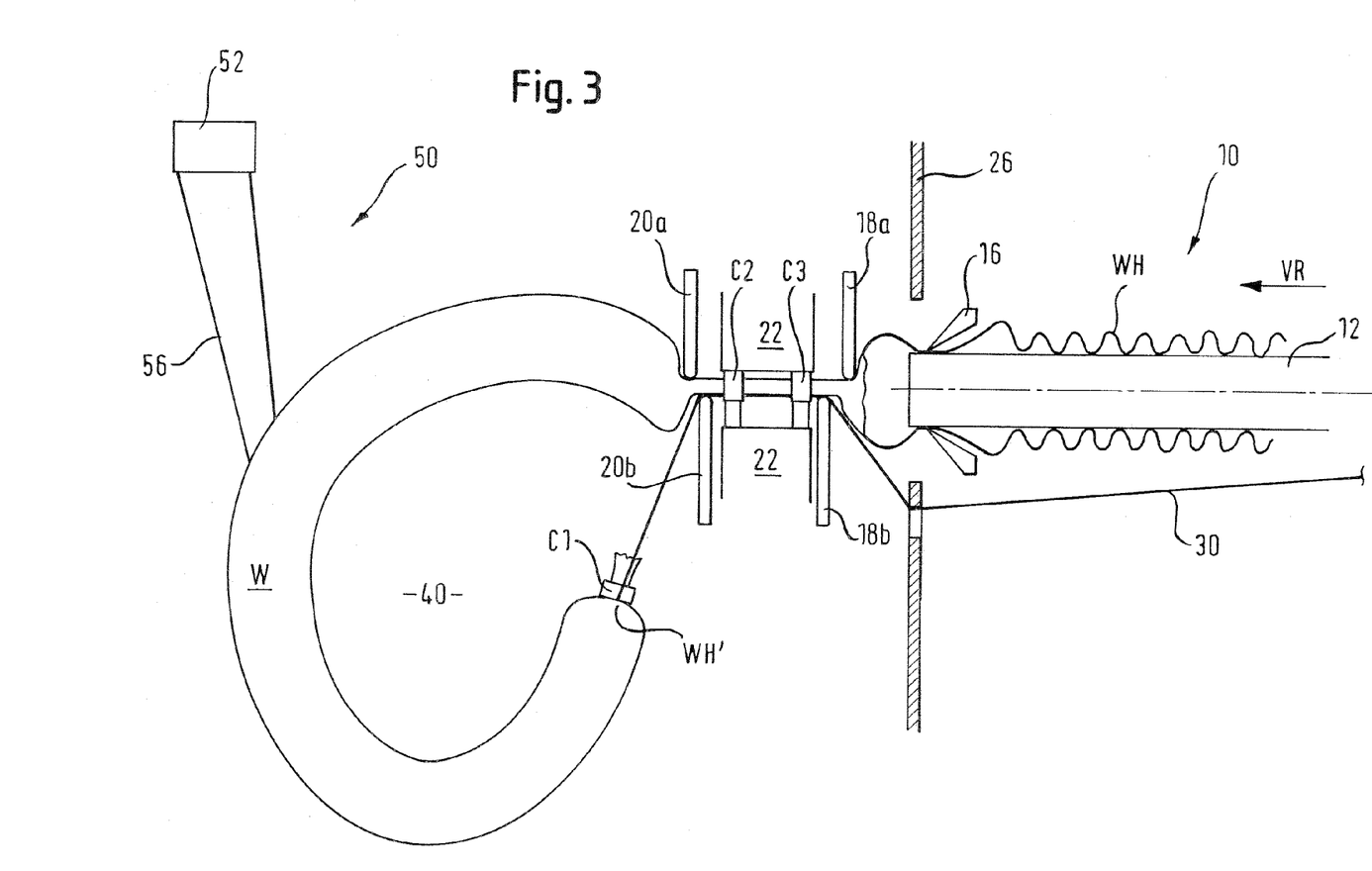
Figure 4:
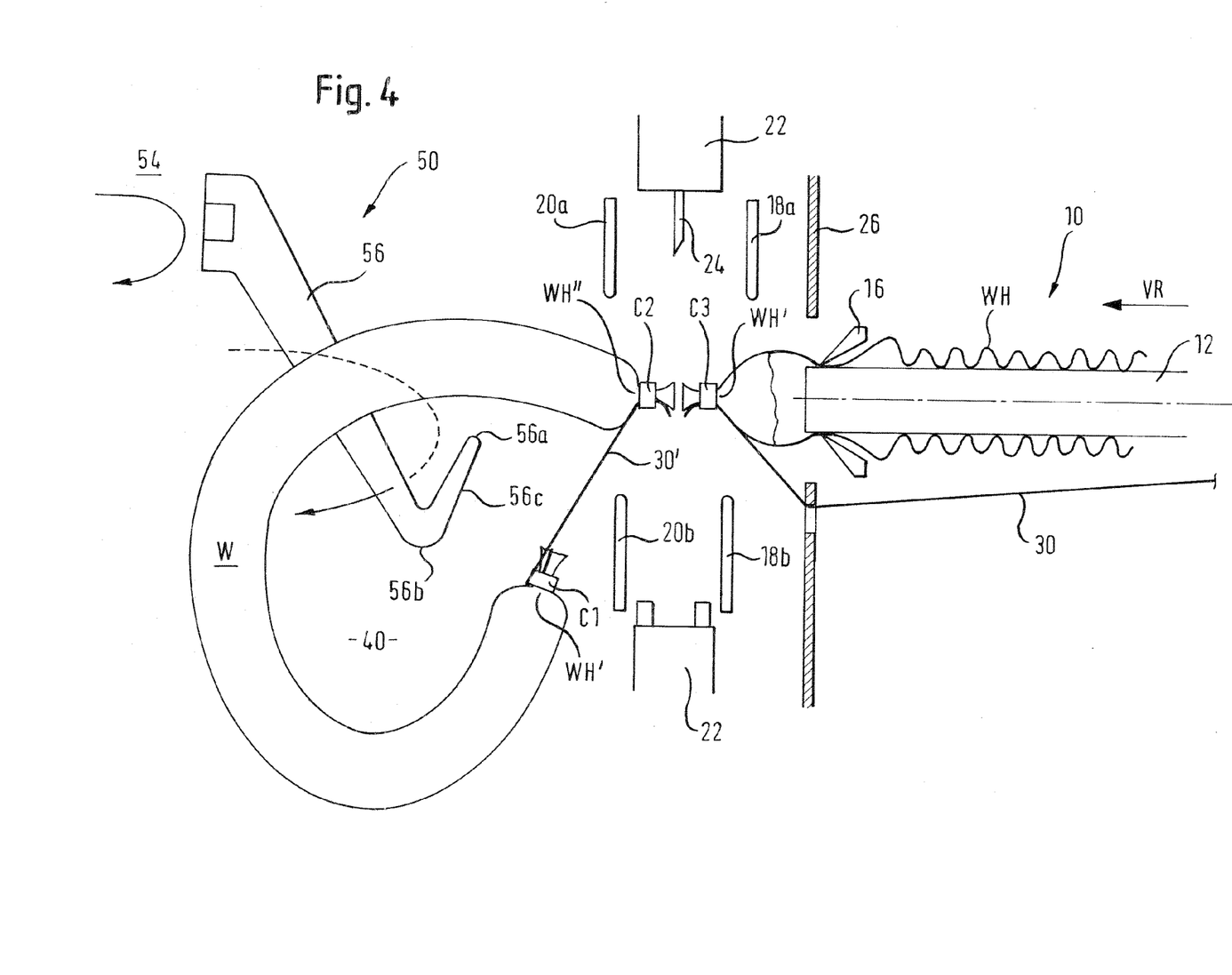

After spreading of the displacer shear pairs 18, 20, the plaited portion of the sausage casing, which is free of filling material and which is disposed between the two displacer shear pairs 18, 20 is closed by means of a second and a third closure clip C2, C3, as shown in FIG. 3. In that operation, the thread 30 is also respectively engaged by the closure clips C2, C3 and in that way fixed to the closed sausage casing WH. In that way, a second or rear closed end WH" of the resulting sausage W and a first or front closed end WH' of a sausage W, which is to be freshly produced are formed. The thread portion 30' of the resulting sausage W, which extends between the two closure clips C1, C2, forms a circle together with the sausage ring configuration.

Finally the sausage casing WH and the thread 30 are severed between the two closure clips C2, C3 by the severing blade 24 so that the actual production procedure for the circular sausage W is completed. Prior to the severing operation, which is performed by means of the severing blade 24, the hook 56 is moved out of its readiness position into the transfer area 40 in such a way that the hook tip 56a and the catch portion 56b projects into the circle formed by the thread portion 30' and the sausage ring (see FIG. 4). In that respect, the hook tip and the catch portion project into the sausage ring circle in such a way that the sausage W is engaged as closely as possible to the filling pipe 12 or the displacer shear pairs 18, 20 so that, when it is taken over by the hook 56, it rotates as a consequence of the force of gravity acting thereon and the thread portion 30' comes to lie in the hook portion 56c, as shown in FIGS. 5 and 6.

When now the sausage is severed between the two closure clips C2, C3 the sausage W can slide on the catch portion 56b to the hook portion 56c and is held there.

Figure 5:
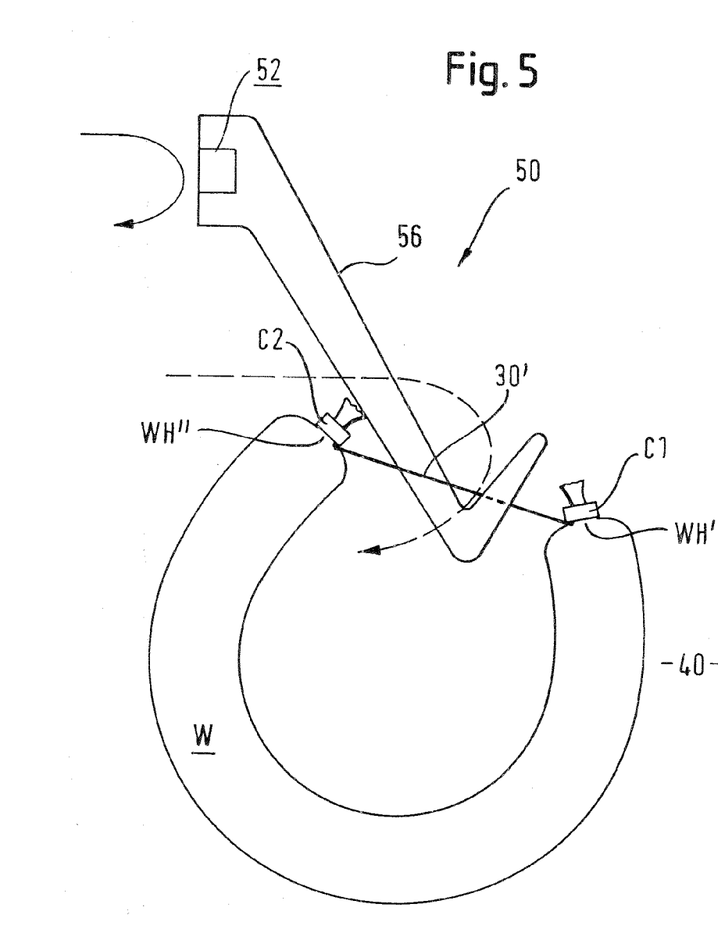
Figure 6:
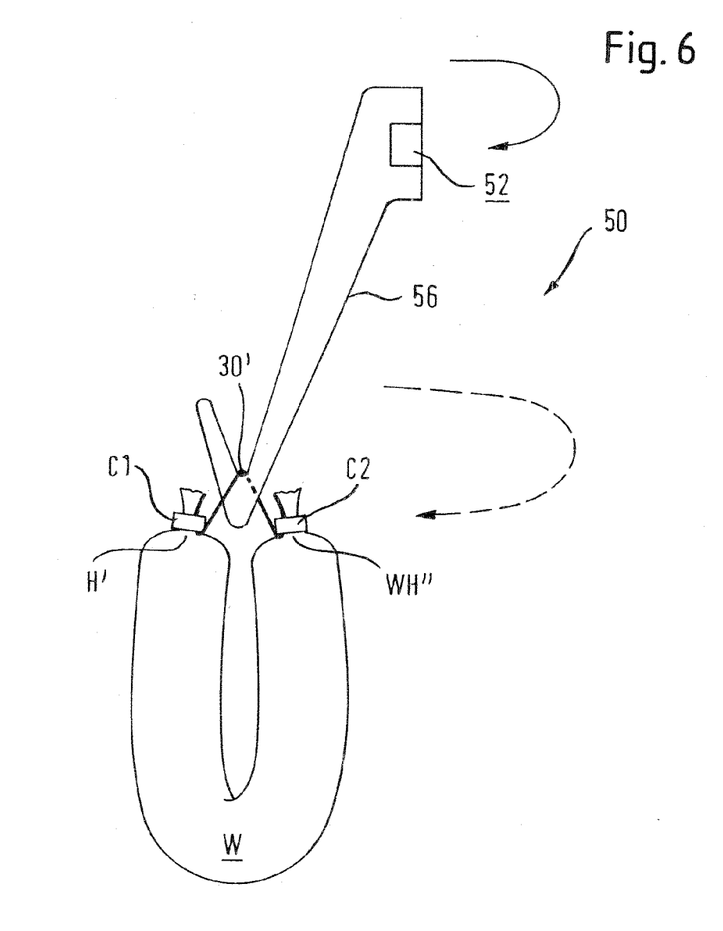

As already mentioned, as a consequence of the force of gravity acting on the sausage W, the sausage W, which has been cut off, slides along the ring or circle formed thereby, on the hook portion 56c, until the thread portion 30' comes to lie in the hook portion 56c, as is shown in FIGS. 5 and 6. The further conveying movement takes place in that position, as is shown in FIG. 6. The sausages W hanging on the hooks 56 can then be transferred for example by hand or machine to smoking stocks (not shown) which are moved into the circle defined by the ring configuration of the sausages W and the yarn portions 30.

At the same time as or immediately after the severing operation the production process for the next sausage W can begin in the above-described manner. It is also to be noted that the conveyor operation can already be continued immediately after the hook 56 has pivoted into the transfer area 40 or into the circle formed by the ring of the sausage W and the thread portion 30'.

The invention claimed is:

1. A system comprising:
    a sausage filling and clipping machine, and
    a motor-driven sausage conveyor apparatus,
    the sausage filling and clipping machine has a filling pipe, and
    a thread feeding device having a supply of thread, the thread being attached to both ends of a sausage product by the sausage filling and clipping machine, the attached thread and sausage product forming a ring;
    the motor-driven sausage conveyor apparatus includes at least one conveyor element and is positioned downstream of the filling pipe of the sausage filling and clipping machine in an advance direction of the sausage, the sausage conveyor apparatus including a chain link conveyor and being immediately adjacent to the filling pipe of the sausage filling and clipping machine such that the ring of sausage product filled and closed at the filling pipe of the sausage filling and clipping machine is engaged by one of the at least one conveyor element of the chain link conveyor.

2. The system as set forth in claim 1 wherein the at least one conveyor element of the chain link conveyor comprises a hook held stationarily in the direction of travel of the conveyor to a drive mechanism of the chain link conveyor.

3. The system as set forth in claim 2 wherein the at least one conveyor element of the chain link conveyor has a catch portion projecting in the direction of travel of the chain link conveyor with respect to the plane containing the longitudinal center line of the conveyor element.

4. The system as set forth in claim 3, wherein the at least one conveyor element comprises a plurality of conveyor elements arranged equidistantly relative to each other.

5. The system as set forth in claim 2 wherein the drive mechanism of the chain link conveyor is an endless traction chain.

6. The system as set forth in claim 1 wherein the at least one conveyor element of the chain link conveyor is movable, between a conveyor position and a transfer position, at least in the region of the filling pipe.

7. The system as set forth in claim 1 wherein the chain link conveyor is a continuous conveyor.

8. The system as set forth in claim 7 wherein the drive mechanism of the chain link conveyor defines a conveyor path which is at least approximately in a horizontal plane and is at least approximately in the shape of an elongate oval.

9. The system as set forth in claim 8 wherein a direction-changing portion of the conveyor path of the chain link conveyor is positioned immediately adjacent to the filling pipe.

10. The system as set forth in claim 1 further comprising a transfer area for the sausage product between the chain link conveyor and the filling pipe.

11. The system as set forth in claim 10 wherein the transfer area extends away from the filling pipe and downwardly therefrom.

12. The system as set forth in claim 1, further comprising a control device controlling the chain link conveyor and at least the filling operation of the sausage filling and clipping machine.

13. A method of operating a system comprising a sausage filling and clipping machine and a motor-driven sausage conveyor apparatus, wherein the sausage filling and clipping machine has a filling pipe and a thread feeding device having a supply of thread, the thread being attached to both ends of a sausage product by the sausage filling and clipping machine, the attached thread and sausage product forming a ring; the motor-driven sausage conveyor apparatus includes at least one conveyor element and is positioned downstream of the filling pipe of the sausage filling and clipping machine in the filling direction of the sausage, the method comprising the steps of:
    arranging the at least one conveyor element of the sausage conveyor apparatus formed by a chain link conveyor in a readiness position in the region of the filling pipe;
    filling sausage meat into a tubular flexible packaging material on the filling pipe of the sausage filling and clipping machine,
    closing the packaging material and cutting off the sausage product formed from the further packaging material on the filling pipe,
    during the step of closing the packaging material and cutting off the sausage product, attaching a thread to the filled sausage product and to a beginning end of the subsequent sausage product, the thread being cut between the filled sausage product and the subsequent sausage product when the step of cutting off the sausage product is performed, the thread attached to both ends of the filled sausage product and the filled sausage product forming a ring;
    moving the conveyor element out of the readiness position into a transfer position at least before the sausage product is cut off; and
    transferring the ring of sausage product to the at least one conveyor element.

14. The method as set forth in claim 13 wherein the step of transferring the ring of sausage product to the conveyor element occurs after the culling-off operation.

15. The method as set forth in claim 13 wherein the step of transferring the ring of sausage product is assisted by the action of the force of gravity on the ring of sausage product.

16. The method as set forth in claim 13 further comprising moving the conveyor element of the chain link conveyor from a readiness position in a vertical plane to the transfer position.

17. The method as set forth in claim 13, further comprising providing a transfer area for the sausage product and forming the resulting sausage product in a vertical plane.

18. The method as set forth in claim 13, wherein the step of arranging the at least one conveyor element in a readiness position comprises arranging the at least one conveyor element such that the force of gravity assists the step of transferring the ring of sausage.

* * * * *

UNITED STATES PATENT AND TRADEMARK OFFICE
CERTIFICATE OF CORRECTION

PATENT NO. : 7,618,307 B2  
APPLICATION NO. : 11/733922  
DATED : November 17, 2009  
INVENTOR(S) : Steven Gladh It is certified that error appears in the above-identified patent and that said Letters Patent is hereby corrected as shown below:

Column 10, line 50, change "culling" to "cutting".

Signed and Sealed this

Thirtieth Day of March, 2010

David J. Kappos  
*Director of the United States Patent and Trademark Office*